(12) United States Patent
Chun

(10) Patent No.: US 8,708,190 B2
(45) Date of Patent: Apr. 29, 2014

(54) ANTI-SLOSHING APPARATUS

(75) Inventor: Sang-Eon Chun, Geoje-si (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 0 days.

(21) Appl. No.: 13/109,798

(22) Filed: May 17, 2011

(65) Prior Publication Data

US 2011/0278305 A1    Nov. 17, 2011

Related U.S. Application Data

(63) Continuation of application No. PCT/KR2009/006720, filed on Nov. 16, 2009.

(30) Foreign Application Priority Data

Nov. 18, 2008  (KR) .................. 10-2008-0114638
Jul. 13, 2009   (KR) .................. 10-2009-0063441
Sep. 28, 2009   (KR) .................. 10-2009-0091819

(51) Int. Cl.
B65D 1/40           (2006.01)

(52) U.S. Cl.
USPC ........................... 220/734; 220/563; 220/578

(58) Field of Classification Search
USPC .............. 220/563, 562, 578, 216, 218, 734
See application file for complete search history.

(56) References Cited

U.S. PATENT DOCUMENTS

| | | | | |
|---|---|---|---|---|
| 1,671,650 A | * | 5/1928 | Newman et al. | 169/57 |
| 3,120,273 A | * | 2/1964 | Kaufman et al. | 169/57 |
| 3,294,278 A | * | 12/1966 | Madden et al. | 220/563 |
| 3,346,138 A | * | 10/1967 | Tubbs | 220/216 |
| 3,349,953 A | * | 10/1967 | Conaway et al. | 220/734 |
| 3,400,854 A | * | 9/1968 | Conaway et al. | 220/734 |
| 3,401,818 A | * | 9/1968 | Hagen | 220/216 |
| 3,443,584 A | * | 5/1969 | Evensen et al. | 137/582 |
| 3,650,431 A | * | 3/1972 | Stewart | 220/88.1 |
| 3,687,329 A | * | 8/1972 | Baum | 220/216 |
| 3,784,050 A | * | 1/1974 | Pollack | 220/734 |
| 3,822,807 A | * | 7/1974 | MacDonald et al. | 220/88.1 |
| 4,013,190 A | * | 3/1977 | Wiggins et al. | 220/501 |
| 4,713,069 A | * | 12/1987 | Wang et al. | 604/378 |
| 4,764,408 A | * | 8/1988 | Stedman et al. | 428/71 |
| 4,974,743 A | * | 12/1990 | Sasaki et al. | 220/694 |
| 5,031,795 A | * | 7/1991 | Kotera et al. | 220/563 |
| 5,042,978 A | * | 8/1991 | Quenin et al. | 604/317 |
| 5,398,840 A | * | 3/1995 | Luhman et al. | 220/563 |
| 5,890,618 A | * | 4/1999 | Spickelmire | 220/563 |

(Continued)

FOREIGN PATENT DOCUMENTS

DE        1297539        6/1969
JP        53126515       11/1978

OTHER PUBLICATIONS

JP Office Action dated Oct. 30, 2012, pp. 1-2.

(Continued)

Primary Examiner — Anthony Stashick
Assistant Examiner — Christopher McKinley
(74) Attorney, Agent, or Firm — Brinks Gilson & Lione

(57) ABSTRACT

An anti-sloshing apparatus comprising: a plurality of buoyant members having buoyancy to be floated on the surface of liquid; a foam member having open cell structure to absorb the liquid and covering the buoyant member; and a connecting member to connect the adjacent buoyant members one another, allows effectively preventing liquid cargo sloshing.

2 Claims, 10 Drawing Sheets

(56) References Cited

U.S. PATENT DOCUMENTS

| | | | |
|---|---|---|---|
| 6,032,347 A * | 3/2000 | Behr et al. | 29/419.1 |
| 6,062,417 A * | 5/2000 | Evans | 220/563 |
| 6,220,287 B1 * | 4/2001 | Wolf | 137/574 |
| 6,308,856 B1 * | 10/2001 | Spickelmire | 220/563 |
| 6,375,030 B1 * | 4/2002 | Spickelmire | 220/563 |
| 6,408,979 B1 * | 6/2002 | Forbes et al. | 181/198 |
| 6,431,388 B1 * | 8/2002 | Spickelmire et al. | 220/563 |
| D469,846 S * | 2/2003 | Spickelmire | D23/206 |
| 6,547,090 B2 * | 4/2003 | Spickelmire et al. | 220/563 |
| 6,848,472 B2 * | 2/2005 | Bambacigno | 137/574 |
| D507,626 S * | 7/2005 | Bambacigno | D23/206 |
| 6,945,423 B2 * | 9/2005 | Wilson | 220/563 |
| 6,966,401 B2 * | 11/2005 | Kojima | 181/233 |
| 7,265,258 B2 * | 9/2007 | Hamilton et al. | 604/374 |
| 7,648,749 B1 * | 1/2010 | Taylor | 428/98 |
| 2002/0063133 A1 * | 5/2002 | Spickelmire et al. | 220/563 |
| 2009/0001085 A1 * | 1/2009 | Bartz et al. | 220/563 |
| 2009/0078705 A1 * | 3/2009 | Ramsay | 220/562 |
| 2011/0186582 A1 * | 8/2011 | Whitaker et al. | 220/563 |

OTHER PUBLICATIONS

Extended European Search Report for corresponding EP Application No. 098276697.5, pp. 1-6, Sep. 16, 2013.

* cited by examiner

ANTI-SLOSHING APPARATUS

TECHNICAL FIELD

The present invention relates to an anti-sloshing apparatus which can not only be easily installed or dismantled in storage space of liquid cargo with various sizes and shapes such as a fuel tank of car or aircraft and a cargo tank of ship but also efficiently inhibit liquid cargo sloshing.

BACKGROUND

Generally, various shapes of vessels have been produced in order to transport liquid cargo by sea. For example, a hull is designed depending on the characteristics of goods to be transported, for example, liquid cargo such as LNG (liquefied natural gas), LPG (liquefied petroleum gas), crude oil and the like and specific types of a cargo tank are applied to seal and store the goods of a hull under low temperature or high pressure conditions.

In manufacturing such hulls and cargo tanks, one of the main loading conditions is a sloshing problem. Sloshing is large liquid movement created by highly strong impact pressure on the inner walls of a storage space (that is, cargo tank) due to violent motion of liquid cargo having a free surface when the liquid cargo receives continuously the kinetic energy caused by the motion of a hull. Therefore, the sloshing problem is considered from the beginning of production of hulls and cargo tanks.

Thus, shapes of hulls and cargo tanks have been designed to minimize sloshing problem of liquid cargo and at the same time enough to withstand expected sloshing loads. In this process, a ship owner has to settle for a conditional operation restriction limiting loadage of a cargo to avoid structurally unbearable sloshing loads. Nevertheless, many problems of unexpected damage to the cargo tank have continuously occurred due to uncertainty of sloshing loads.

Such sloshing problems are the challenge to be solved in fuel tanks of space, aircraft and car industries as well as cargo tanks of ships. Because unlike ships, it is more important to supply fuel smoothly than to reinforce structure of a fuel tank in spaceship or airplane due to rapid fluid motion caused by sudden motions of the fuel tank such as a 360° rotation, sloshing problems have been resolved by controlling the motion of liquid cargo, for example liquid fuel.

DISCLOSURE

Technical Problem

The present invention is to provide an anti-sloshing apparatus to effectively prevent sloshing of liquid cargo stored in a storage space of liquid cargo having various standards or shapes such as fuel tanks of cars or aircrafts and cargo tanks of ships.

Technical Solution

According to an aspect of the present invention, there is provided an anti-sloshing apparatus comprising: a plurality of buoyant members having buoyancy to be floated on the surface of liquid; a foam member having open cell structure to absorb the liquid and covering the buoyant member; and a connecting member to connect the adjacent buoyant members one another.

Here, the foam member may be composed of a material having elasticity at a temperature where the liquid maintains its liquid state. Here, the foam member may be formed of a material including a melamine resin.

The plurality of the buoyant members may be arranged in a grid form by the connecting member. The circumferential surfaces of the adjacent foam member may be contacted each other.

Further, length of the connecting member may be adjustable to prevent sagging of the plurality of the buoyant members. The connecting member may comprise: a rim formed on the circumferential surface of the buoyant member and on which fastener holes are formed; and a chain where a fastening hook to fasten to the fastener hole is formed at both ends.

Any one of anti-sloshing apparatuses described above may further comprise a cover to cover the foam member to prevent outlet of debris of the foam member. The cover may be composed of a polyacrylate resin.

The connecting member, which is interposed between the covers of the adjacent buoyant members, may be one selected from the group consisting of zipper, buckle, Velcro® tape, belt and a combination thereof.

The foam member of any one of anti-sloshing apparatuses described above may be a cubic shape.

Advantageous Effects

An anti-sloshing apparatus according to the present invention can not only be easily installed or dismantled for storage space of liquid cargo with various sizes and shapes such as fuel tanks of cars or aircrafts and cargo tanks of ships but also efficiently inhibit liquid cargo sloshing and minimize the storage space of the liquid cargo by mechanically connecting blocks floating on the liquid cargo and preventing liquid sloshing each other and thus assembling to be an integral buoy on the surface of the liquid cargo.

<DESCRIPTION OF REFERENCE NUMBERALS>

Figure 1:
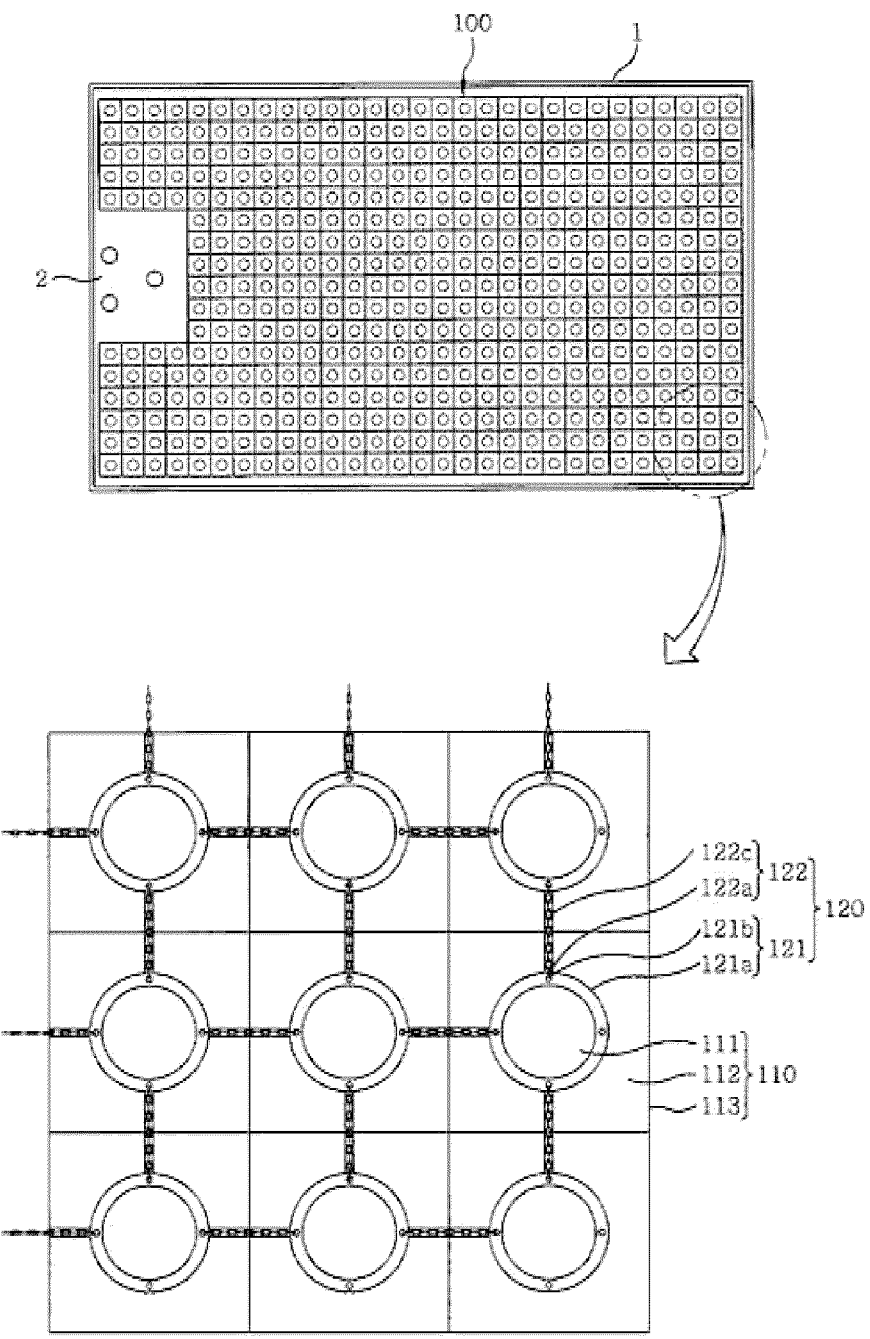
FIG. 1 is a plan view illustrating installation of an anti-sloshing apparatus according to a first embodiment of the present invention.

110, 210, 310, 410, 510: anti-sloshing block
111: buoyant member
112: foam member
112a: drawing out hole
113, 213, 313, 413, 513: cover
113a: drawing out hole
120, 220, 320, 420, 520: connecting member
121: fixing part
121a: rim
121b: fastener holes
122: connecting member
122a: fastening hook
122b: fastener
122c: chain
221: zipper
221a: zipper tape
221b: teeth of zipper
221c: slider
321: buckle
321a: female buckle
321b: male buckle
421: Velcro ® tape
421a: hook member
421b: roof member
521: belt
521a: fastening member
521b: fastening hook
521c: fastener holes
521d: fastener

MODE FOR INVENTION

Certain embodiments of the invention will be described below in more detail with reference to the accompanying drawings. Throughout the description of the present invention, when describing a certain technology is determined to evade the point of the present invention, the pertinent detailed description will be omitted.

Figure 2:
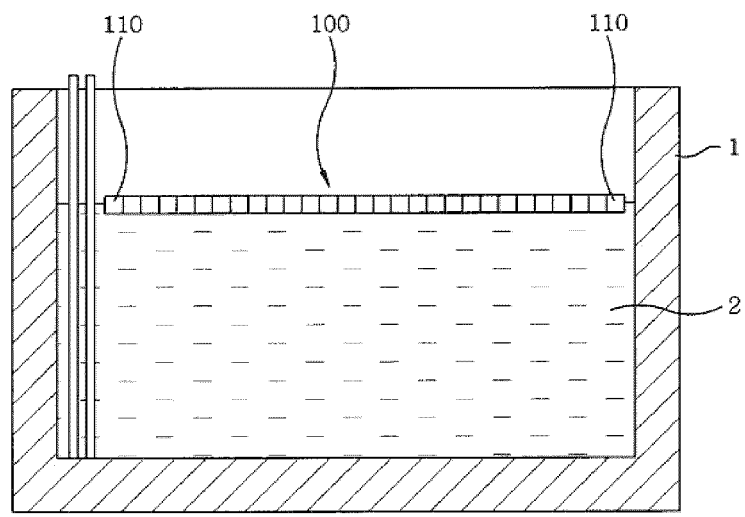
FIG. 2 is a side view illustrating installation of an anti-sloshing apparatus according to a first embodiment of the present invention.

FIG. 1 is a plan view illustrating installation of an anti-sloshing apparatus according to a first embodiment of the present invention. FIG. 2 is a side view illustrating installation of an anti-sloshing apparatus according to a first embodiment of the present invention. As shown in FIG. 1 and FIG. 2, an anti-sloshing apparatus according to a first embodiment of the present invention 100 includes a plurality of anti-sloshing blocks 110 floating on a liquid cargo 2 and preventing sloshing, a connecting means 120 connecting the anti-sloshing blocks 110 each other and an installation member 130 installing the anti-sloshing blocks 110 in a cargo tank 1.

It shows that the anti-sloshing apparatus according to a first embodiment of the present invention 100 is installed on the surface of the liquid cargo 2 stored in a cargo tank of ship 1 but it is not limited thereto. It can be installed not only on the surface of fuel stored in a fuel tank of car or aircraft but also on the surface of various liquid cargos which can cause sloshing. This will be applied for anti-sloshing apparatuses according to the other embodiments of the present invention.

Figure 3:
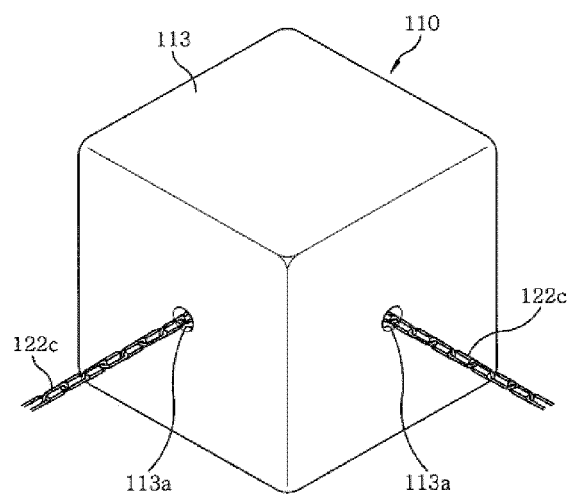
FIG. 3 is a perspective view illustrating an anti-sloshing apparatus according to a first embodiment of the present invention.
Figure 4:
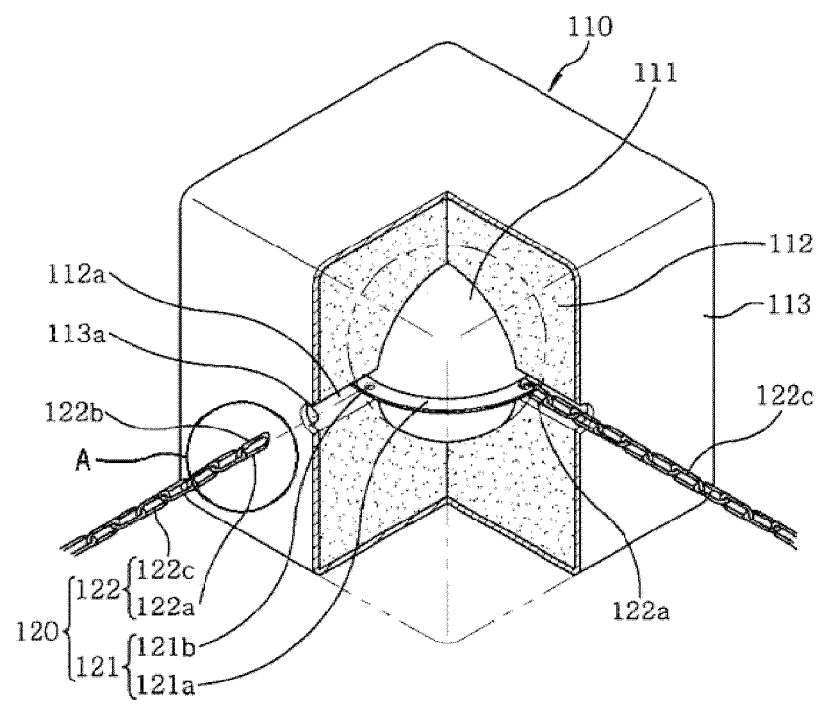
FIG. 4 is a perspective view illustrating a partially incised anti-sloshing apparatus according to a first embodiment of the present invention.

FIG. 3 is a perspective view illustrating an anti-sloshing apparatus according to a first embodiment of the present invention. FIG. 4 is a perspective view illustrating a partially incised anti-sloshing apparatus according to a first embodiment of the present invention.

As shown in FIG. 3 or FIG. 4, an anti-sloshing block 110 includes a buoyant member 111 having buoyancy to be floated on the liquid cargo 2, a foam member 112 covering the buoyant member 111 and a cover 113 covering the foam member 112.

The anti-sloshing block 110 is connected each other by the connecting means 120. For example, the anti-sloshing blocks can be a cube shape to facilitate their connections so that they can be connected in a grid form by the connecting means 120.

Size or shape of the anti-sloshing block 110 can be changed variously to be assembled appropriately according to storage size in which the liquid cargo 2 is stored. The anti-sloshing block 110 can be manufactured in a cube or cuboid shape having 1.0-1.5 m of width, depth and height when cuboid shape of the anti-sloshing block is installed in the cargo tank of ship 1 as in embodiments of the present invention.

The buoyant member 111 has buoyancy to be floated on the liquid cargo 2, for example LNG and the like, and the buoyancy can be obtained according to material or structural characteristics.

As an example of obtaining the buoyancy by structural characteristics, it may have hollow structure having hermetic space to fill gas therein which does not cause phase transition at cryogenic temperature when the liquid cargo 2 is LNG. The hollow shape may be sphere as in the embodiments of the present invention or it may be polyhedron, ellipsoid or a variety of other structures.

The buoyant member 111 can be manufactured with a material, such as aluminum or aluminum alloy, having enough strength not to change shape and performing its role under cryogenic temperature condition caused by the liquid cargo 2 such as LNG and the like.

The foam member 112 covers the outer surface of the buoyant member 111 and shape is cuboid as in the embodiments of the present invention but it is not limited thereto. For example, it can be sphere, ellipsoid, polyhedron, etc.

The foam member 112 may have open cell structure to effectively prevent sloshing by absorbing the liquid cargo 2. The open cell structure is a structure having holes formed on the circumferential surface of the foam member 112 and passing through the inside and the outside of the foam member 112, maximizes the surface area and facilitates the absorption of the liquid to the surface.

The foam member 112 may be formed of for example a synthetic resin such as a open cell structured material including melamine resin which maintains the liquid cargo 2 such as LNG in a liquid phase, is still able to absorb liquid cargo 2, and has elasticity at cryogenic temperature. The foam member 112 may further include a phenol resin in addition to melamine resin.

Such resins maintain their physical properties at cryogenic condition similar to those at room temperature. For example, Basotect® manufactured and provided by BASF AG may be used.

Therefore, the foam member 112 keeps its elasticity at cryogenic condition and acts as shock absorber to absorb impact caused by collision between foam members 112.

Further, the foam member 112 can prevent damage to the inner wall of the cargo tank 1 when it hits the inner wall of the cargo tank 1.

The foam member 112 may also prevent its damage by collision between foam members 112 because the foam member 112 keeps its elasticity at cryogenic temperature and brittleness thereof is not thus increased.

The cover 113 covers the foam member 112, prevents damage of the foam member 112, and prevents contamination of the liquid cargo due to debris of the foam member 112.

The cover 113 may be formed of a material having durability at cryogenic temperature which is similar to that at room temperature. For example, it may be formed of polyacrylate.

As shown in FIG. 4, the connecting means 120 includes a fixing part 121 formed on the outer surface of the buoyant member 111, a foam member 112 to fasten to the fixing part 121 and the fixing part 121 of another buoyant member 111, and a connecting member 122 drawn from the cover 113 through drawing out holes 112a, 113a of the cover 113.

The fixing part 121 is formed along the circumference of the buoyant member 111 and is formed as a rim 121a having a number of fastener holes 121b spaced-apart each other. It can be formed at the same time when the buoyant member 111 is manufactured or it can be formed integrally with the buoyant member 111 by, for example, welding.

Figure 5:
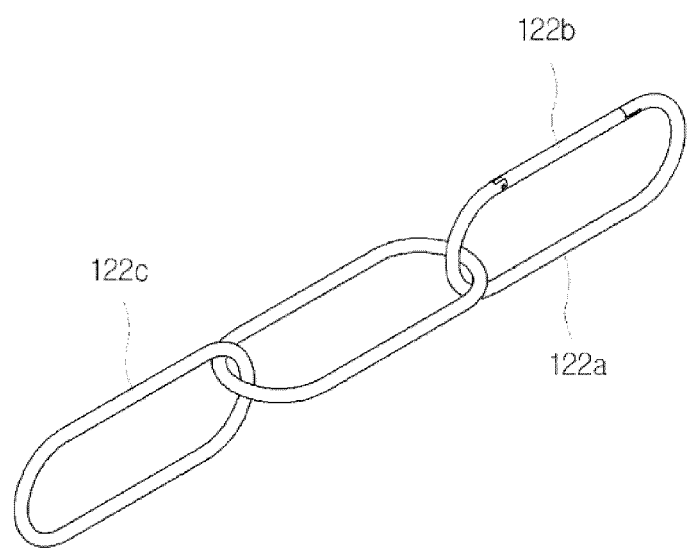
FIG. 5 is a magnified view of A part of FIG. 4.

FIG. 5 is a magnified view of A part of FIG. 4. As shown in FIG. 4 and FIG. 5, the connecting member 122 can be formed as chain 122c having fastening hooks 122a at both ends thereof to be fastened to the fastener holes 121b, wherein the fastening hook 122a fastening to the fastener holes 121b can be detachable by opening or closing a fastener 122b returning by a spring and the chain 122c can be designed to resist only against tension.

In addition, the length of the chain 122c can be adjustable to prevent sagging of the anti-sloshing block 110 by controlling the number of chains according to level of the liquid cargo 2.

Functions of the anti-sloshing apparatus according to a first embodiment of the present invention 100 having such configurations will be described below.

The anti-sloshing blocks 110 can be assembled in an integrated buoy on the surface of the liquid cargo 2 such as LNG (liquefied natural gas), LPG (liquefied petroleum gas), crude oil and the like stored in the cargo tank 1 by the connecting means 120, particularly fastening the fixing parts 121 formed on the buoyant member 111 with the connecting member 122.

Here, the anti-sloshing block 110 floats on the liquid cargo 2 by the buoyant member 111, while it floats in the state that a part thereof is immersed when the liquid cargo is absorbed by the foam member 112. Thus, it covers the free surface of the liquid cargo 2 so that sloshing caused by the liquid cargo 2 in the cargo tank 1 can be prevented when a ship moves in different directions such as pitch, roll, yaw, weaving, etc.

Further, the anti-sloshing block 110 is arranged in a grid form and the connecting means 120 connects the anti-sloshing blocks 110 to be the circumferential surfaces of adjacent thereof contacted one another so that sagging of the anti-sloshing block 110 can be prevented.

Connections between adjacent anti-sloshing blocks 110 prevents folding of the anti-sloshing apparatus 100 and deteriorating anti-sloshing action due to spaces which can be formed between adjacent anti-sloshing blocks 110 when a ship moves in different directions such as pitch, roll, yaw, weaving, etc.

Figure 6:
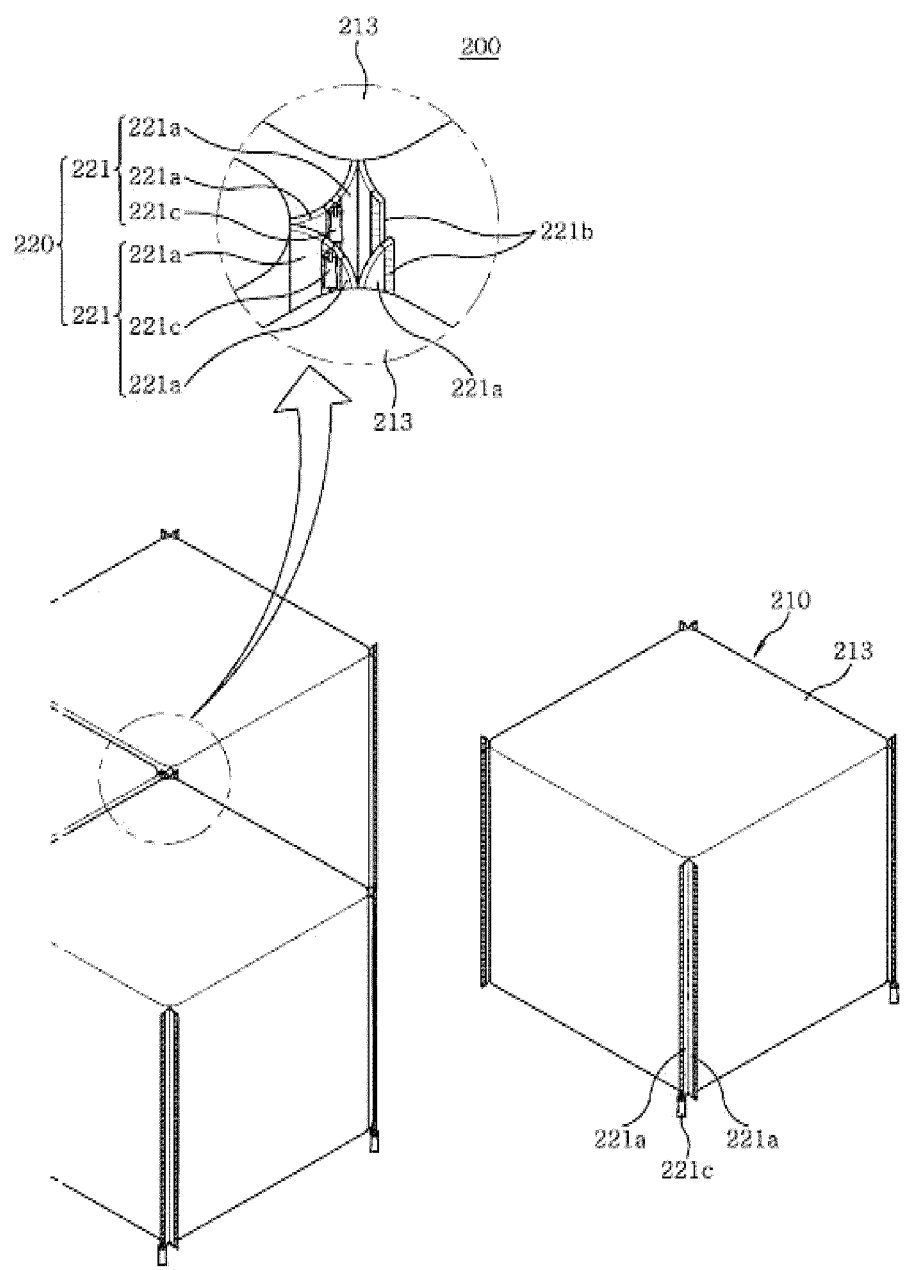
FIG. 6 is a perspective view illustrating a connection part of an anti-sloshing apparatus according to a second embodiment of the present invention.

FIG. 6 is a perspective view illustrating a connection part of an anti-sloshing apparatus according to a second embodiment of the present invention. As shown in FIG. 6, an anti-sloshing apparatus according to a second embodiment of the present invention 200 includes a plurality of anti-sloshing blocks 210 floating on the liquid cargo to prevent sloshing and a connecting member 220 connecting the anti-sloshing blocks 210 one another.

In the anti-sloshing block 210 as that of the anti-sloshing apparatus according to a first embodiment 100, a buoyant member floating on the liquid cargo is covered by a foam member and the foam member is covered by a cover 210. Thus, its description will be omitted since it has been described in detail for the anti-sloshing apparatus according to a first embodiment 100.

The connecting member 220 may be a zipper 221 to be closed and opened at each cover 210 of the anti-sloshing blocks 210.

The zipper 221 is formed at the edges to be perpendicular to the cover 210 and a pair of zipper tapes 221a of the zipper 221 is fixed to each edge of the cover 210 to connect the anti-sloshing blocks 210. A slider 221c sliding at one of the zipper tapes 221a and arranged with teeth 221b along the length connects the anti-sloshing blocks 210 each other by connecting the teeth 221b of the zipper tapes 221a.

Here, as shown in FIG. 5, two of the zipper tapes 221a are fixed at each edge of the cover 210 to connect edges of the covers 210 of two different anti-sloshing blocks 210.

Functions of the anti-sloshing apparatus according to a second embodiment of the present invention 200 having such configurations will be described below.

The anti-sloshing apparatus according to a second embodiment of the present invention 200 also efficiently prevents sloshing of the liquid cargo by connecting anti-sloshing blocks 210 to be an integral buoy and floated on the surface of the liquid cargo by the zipper 221 which is the connecting member 220 as the anti-sloshing apparatus according to a first embodiment of the present invention 100. The anti-sloshing blocks 210 can be easily connected and separated by using the zipper 221.

Figure 7:
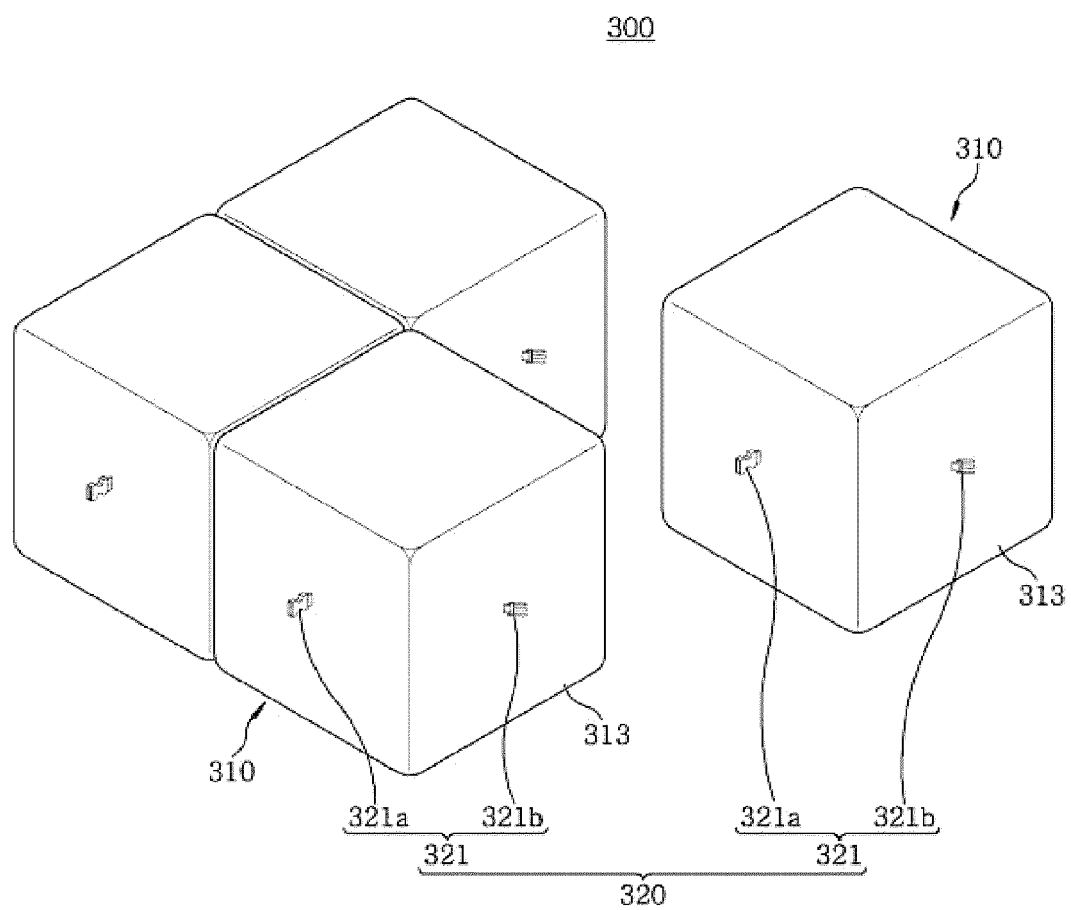
FIG. 7 is a perspective view illustrating a connection part of an anti-sloshing apparatus according to a third embodiment of the present invention.
Figure 8:
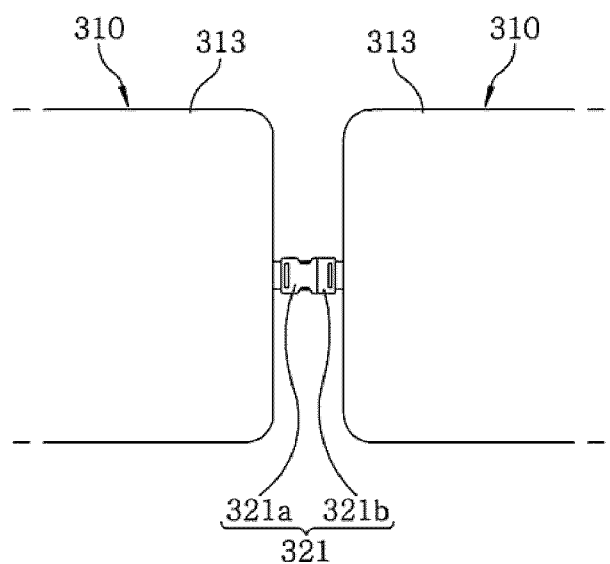
FIG. 8 is a magnified view illustrating a connecting member of an anti-sloshing apparatus according to a third embodiment of the present invention.

FIG. 7 is a perspective view illustrating a connection part of an anti-sloshing apparatus according to a third embodiment of the present invention. FIG. 8 is a magnified view illustrating a connecting member of an anti-sloshing apparatus according to a third embodiment of the present invention. As shown in FIG. 7 and FIG. 8, an anti-sloshing apparatus according to a third embodiment of the present invention 300 includes a plurality of anti-sloshing blocks 310 floating on the liquid cargo to prevent sloshing and a connecting member 320 connecting the anti-sloshing blocks 310 one another.

In the anti-sloshing block 310 as that of the anti-sloshing apparatus according to a first embodiment 100, a buoyant member floating on the liquid cargo is covered by a foam member and the foam member is covered by a cover 313. Thus, its description will be omitted since it has been described in detail for the anti-sloshing apparatus according to a first embodiment 100.

The connecting member 320 may be a buckle 321 to be fastened at each cover 313 of the anti-sloshing blocks 310. The buckle 321 includes a female buckle 321a and a male buckle 321b which are fixed to each cover 313 to be connected. Thus, the anti-sloshing blocks 310 are connected by fastening the female buckle 321a with the male buckle 321b.

Functions of the anti-sloshing apparatus according to a third embodiment of the present invention 300 having such configurations will be described below.

The anti-sloshing apparatus according to a third embodiment of the present invention 300 also efficiently prevents sloshing of the liquid cargo by connecting anti-sloshing blocks 310 to be an integral buoy and floated on the surface of the liquid cargo by the buckle 321 which is the connecting member 320 as the anti-sloshing apparatus according to a first embodiment of the present invention 100. The anti-sloshing blocks 310 can be easily connected and separated by using the buckle 321.

Figure 9:
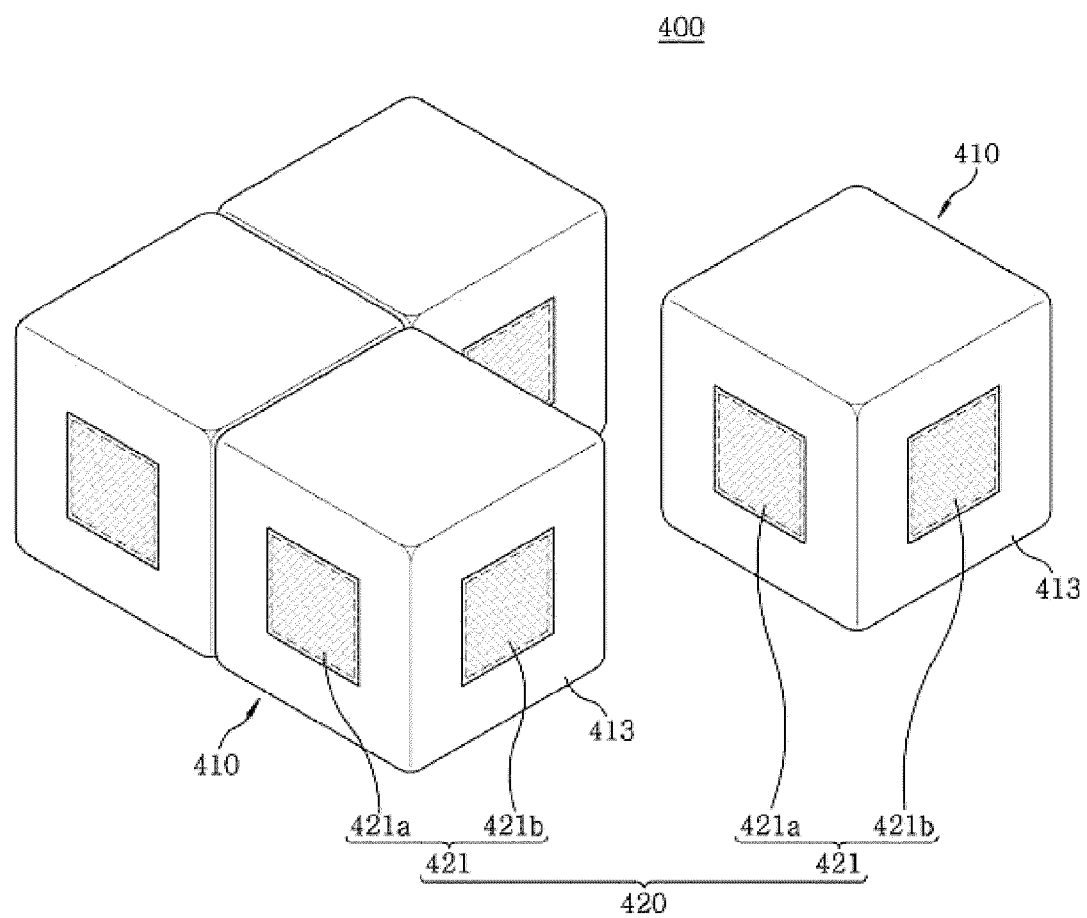
FIG. 9 is a perspective view illustrating a connection part of an anti-sloshing apparatus according to a fourth embodiment of the present invention.

FIG. 9 is a perspective view illustrating a connection part of an anti-sloshing apparatus according to a fourth embodiment of the present invention. As shown in FIG. 9, an anti-sloshing apparatus according to a fourth embodiment of the present invention 400 includes a plurality of anti-sloshing blocks 410 floating on the liquid cargo to prevent sloshing and a connecting member 420 connecting the anti-sloshing blocks 410 one another.

In the anti-sloshing block 410 as that of the anti-sloshing apparatus according to a first embodiment 100, a buoyant member floating on the liquid cargo is covered by a foam member and the foam member is covered by a cover 413. Thus, its description will be omitted since it has been described in detail for the anti-sloshing apparatus according to a first embodiment 100.

The connecting member 420 may be a Velcro® tape 421 to be fastened at each cover 413 of the anti-sloshing blocks 410. A hook member 421a and a roof member 421b of the Velcro® tape 421 to be attached each other are fixed at each side of the cover 413 to connect anti-sloshing blocks 410.

Functions of the anti-sloshing apparatus according to a fourth embodiment of the present invention 400 having such configurations will be described below.

The anti-sloshing apparatus according to a fourth embodiment of the present invention 400 also efficiently prevents sloshing of the liquid cargo by connecting anti-sloshing blocks 410 to be an integral buoy and floated on the surface of the liquid cargo by the Velcro® tape 421 which is the connecting member 420 as the anti-sloshing apparatus according to a first embodiment of the present invention 100. The anti-sloshing blocks 410 can be easily connected and separated by using the Velcro® tape 421.

Figure 10:
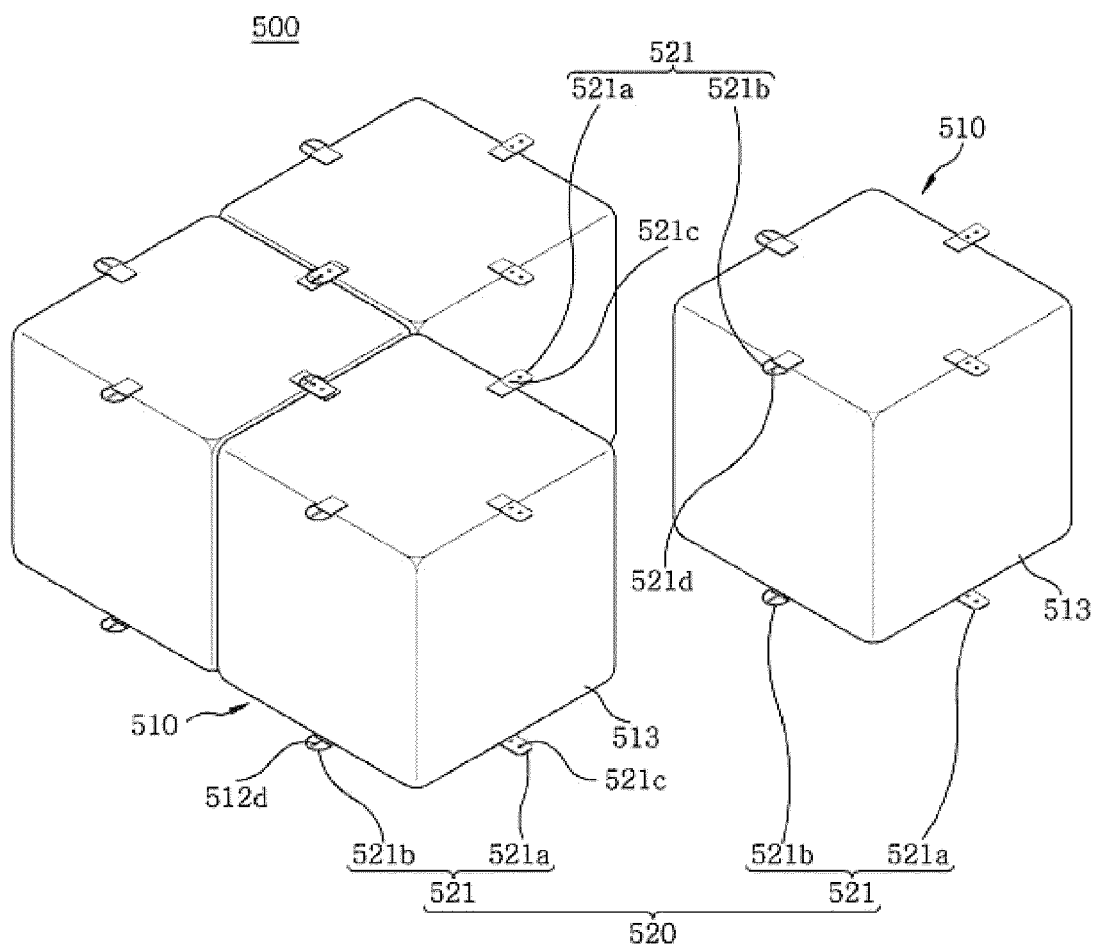
FIG. 10 is a perspective view illustrating a connection part of an anti-sloshing apparatus according to a fifth embodiment of the present invention.

FIG. 10 is a perspective view illustrating a connection part of an anti-sloshing apparatus according to a fifth embodiment of the present invention. As shown in FIG. 10, an anti-sloshing apparatus according to a fifth embodiment of the present invention 500 includes a plurality of anti-sloshing blocks 510 floating on the liquid cargo to prevent sloshing and a connecting member 520 connecting the anti-sloshing blocks 510 one another.

In the anti-sloshing block 510 of this embodiment as that of the anti-sloshing apparatus according to a first embodiment 100, a buoyant member floating on the liquid cargo is covered by a foam member and the foam member is covered by a cover 513. Thus, its description will be omitted since it has been described in detail for the anti-sloshing apparatus according to a first embodiment 100.

The connecting member 520 may be a belt 521 to be fastened each other at each cover 513 of the anti-sloshing blocks 510. The belts 521 are formed at the upper part and the bottom part of the cover 513 to connect the upper parts and the bottom parts of the anti-sloshing blocks 510. The belt 521 is formed with a fastening member 521a and a fastening hook 521b to be connected each other.

One side of the fastening member 521a is fixed to the cover 513 and one or more of fastener holes 521c are formed at the free end.

One side of the fastening hook 521b is fixed to the cover 513 and a fastener 521d is formed to fasten to the fastener holes 521c of the fastening member 521a inserted toward inside.

Functions of the anti-sloshing apparatus according to a fifth embodiment of the present invention 500 having such configurations will be described below.

The anti-sloshing apparatus according to a fifth embodiment of the present invention 500 efficiently prevents sloshing of the liquid cargo by connecting the upper parts and the bottom parts of the anti-sloshing blocks 510 to be an integral buoy and floated on the surface of the liquid cargo by the belt 521 which is the connecting member 520. The anti-sloshing blocks 510 can be easily connected and separated by using the belt 521.

Further, an anti-sloshing apparatus according to the present invention may use any combination of the connecting members described in the embodiments. That is, anti-sloshing blocks can be connected by any combination of the fixing part (121; FIG. 1 and FIG. 4) and the connecting member (122; FIG. 1 and FIG. 4), the zipper (221; FIG. 5), the buckle (321; FIG. 6 and FIG. 7), the Velcro® tape (421; FIG. 8), the belt (521; FIG. 9).

According to the embodiments of the present invention, an anti-sloshing apparatus can be easily installed or dismantled in a storage space of liquid cargo with various sizes and shapes such as a fuel tank of car of aircraft or a cargo tank of ship by mechanically connecting anti-sloshing blocks to be floated as an integral buoy on the surface of the liquid cargo such as LNG, LPG, crude oil and the like stored in a cargo tank of ship or the liquid cargo such as fuel stored in a fuel tank of car or aircraft. Also it also efficiently inhibits liquid cargo sloshing, minimizes the storage space of the liquid cargo, and is suitable for cryogenic temperature environment such as LNG.

When applied to the cargo tank of ship, it can remove filling height restriction, which is a current liquid cargo shipping restriction, and save steel in manufacturing a ship since lower and upper chamfer structure can be improved for sloshing in the hull design. Such advantages are more efficient when it is applied in LNG FSRU (floating storage and regasification unit), FPSO (floating production storage offloading) and the like since a lower chamfer can be minimized.

While it has been described with reference to particular embodiments, it is to be appreciated that various changes and modifications may be made by those skilled in the art without departing from the spirit and scope of the embodiment herein, as defined by the appended claims and their equivalents. As such, many changed or modified embodiments other than that set forth above can be found in the appended claims.

The invention claimed is:
1. An anti-sloshing apparatus comprising:
a plurality of anti-sloshing blocks each including a buoyant member and a foam member surrounding the buoyant member; and
a plurality of connecting members that removably connect the plurality of anti-sloshing blocks together to form a grid structure,
wherein each one of the anti-sloshing blocks is removably connected to adjacent ones of the anti-sloshing blocks by the connecting members and is detachable from the adjacent ones of the anti-sloshing blocks by detaching adjacent ones of the connecting members without affecting a structure formed by the other ones of the anti-sloshing blocks.
2. The anti-sloshing apparatus according to claim 1, wherein the connecting members are attached to the foam members without penetrating the buoyant member.

* * * * *